United States Patent [19]

Hibino et al.

[11] Patent Number: 4,532,900
[45] Date of Patent: Aug. 6, 1985

[54] DECELERATION CONTROL APPARATUS FOR A MULTI-CYLINDER INTERNAL COMBUSTION ENGINE

[75] Inventors: Yoshitaka Hibino, Kamifukuoka; Syunzaburo Ozaki, Sakado, both of Japan

[73] Assignee: Honda Giken Kogyo Kabushiki Kaisha, Tokyo, Japan

[21] Appl. No.: 477,667

[22] Filed: Mar. 22, 1983

[51] Int. Cl.³ ............................................. F02M 23/06
[52] U.S. Cl. ...................................... 123/327; 123/587
[58] Field of Search ........ 123/320, 327, 328, DIG. 11, 123/587

[56] References Cited

U.S. PATENT DOCUMENTS

| | | | |
|---|---|---|---|
| 3,682,148 | 8/1972 | Harrison et al. ................... | 123/328 |
| 4,051,674 | 10/1977 | Suzuki ................................. | 123/587 |
| 4,094,282 | 6/1978 | Nakano et al. ..................... | 123/407 |
| 4,178,890 | 12/1979 | Yamabe et al. ..................... | 123/327 |
| 4,195,602 | 4/1980 | Yamashita et al. ................. | 123/327 |
| 4,278,063 | 7/1981 | Nakamura et al. ................. | 123/587 |

Primary Examiner—William A. Cuchlinski, Jr.
Attorney, Agent, or Firm—Armstrong, Nikaido, Marmelstein & Kubovcik

[57] ABSTRACT

Deceleration control apparatus including a device for closing the throttle valve beyond its idling position during deceleration and a device for supplying secondary air to the intake passage downstream of the throttle valve at the same time. The air supply device includes an air supply opening directly in part of the diverged passages downstream of the first diverged portion of the intake manifold.

6 Claims, 4 Drawing Figures

DECELERATION CONTROL APPARATUS FOR A MULTI-CYLINDER INTERNAL COMBUSTION ENGINE

BACKGROUND OF THE INVENTION

This invention relates to a deceleration control apparatus for a multi-cylinder internal combustion engine mounted on a motorcar or the like.

Known apparatuses for deceleration control of an engine are often provided with a valve closing means for closing the throttle valve in the intake passage of the engine beyond its idling speed position at the time of deceleration so that the amount of fuel consumed is decreased at the time of deceleration. This results in improving in the fuel economy. However, such an apparatus has a disadvantage that when the throttle valve is closed at the time of deceleration, suction is not generated which draws the lubrication oil into the combustion chamber of each cylinder during the intake stroke of the engine by an excessive increase in intake negative pressure. Consequently, oil consumption is increased. For preventing this, the known apparatus has been provided with an air supply means for supplying secondary air to the intake passage in order to prevent such an excessive increase of the intake negative pressure. It has been usual with this known apparatus that the secondary air is supplied to a diverging portion of an intake manifold provided in the intake passage immediately downstream of the throttle valve. However, a secondary disadvantage can result.

Namely, during the time when the secondary air flows from the diverged portion through respective diverged passages on the downstream side of the diverging portion into the respective cylinders, the fuel previously adhered to the wall surfaces of the diverging portion and the diverged passages of the intake passage is carried away by the secondary air and the wall surfaces are dried. Consequently, when the throttle valve is returned from its closed position to its idling position, the fuel content in the gas mixture tends to adhere to the dried wall surfaces. Thus, the air-fuel ratio of the gas mixture supplied to each respective cylinder becomes lean and the returning characteristics of the engine are lowered.

OBJECT AND SUMMARY OF THE INVENTION

This invention has for its object to provide an apparatus wherein secondary air is supplied at the time of deceleration so that excessive increase in intake negative pressure does not result and wherein adhered fuel on the wall surfaces of the intake passage is greatly removed.

The above object is obtained in an apparatus which comprises a valve closing means for closing a throttle valve, which is provided in an intake passage including an intake manifold connected to respective cylinders of a multi-cylinder engine, beyond the idling position thereof at the time of deceleration, and an air supply means for supplying a secondary air to the intake passage, the air supply means having an air supply opening directly in part of diverged passages formed on the downstream side of a diverging portion of the intake manifold.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
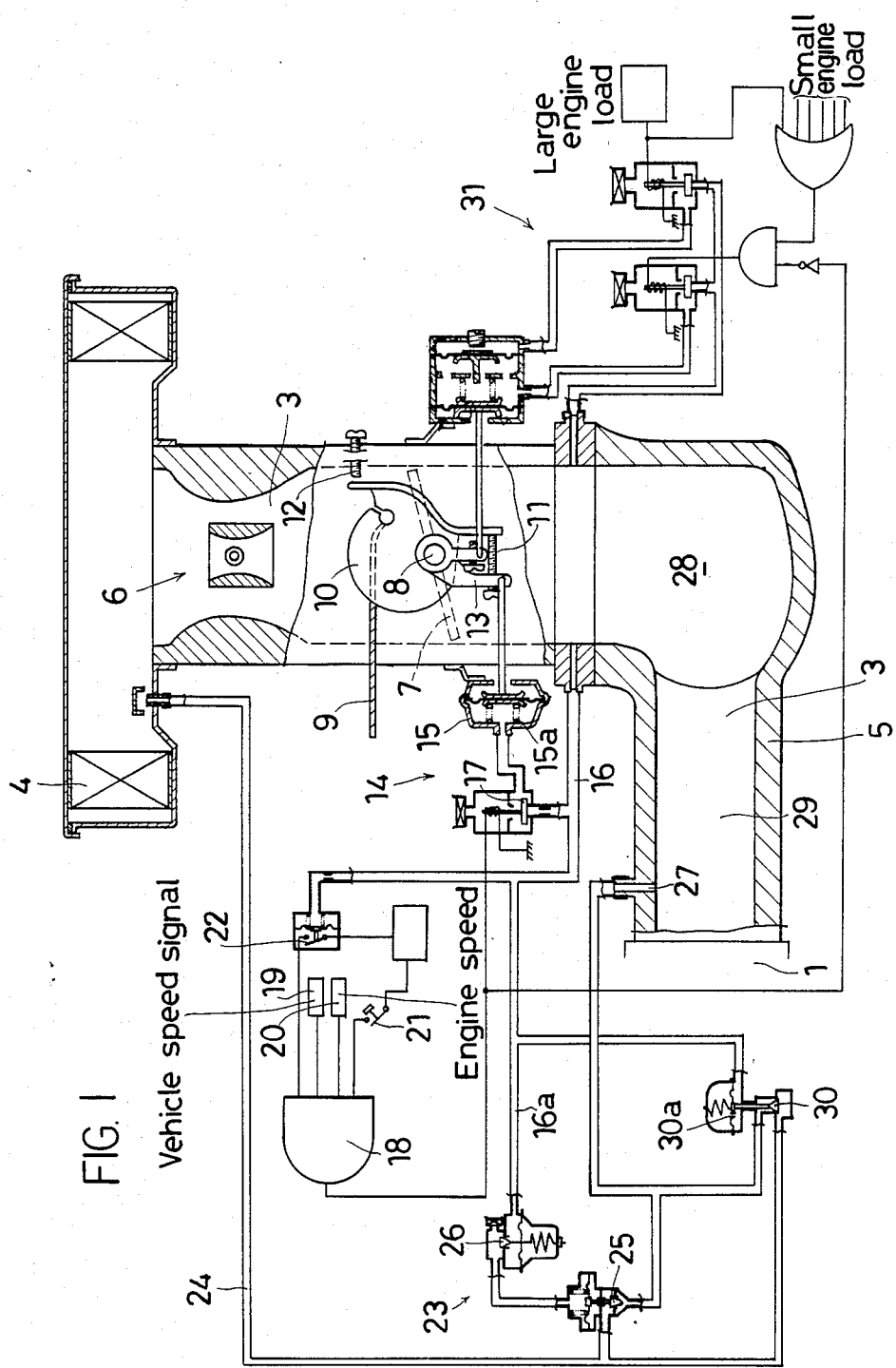
FIG. 1 is a system diagram showing a first embodiment of this invention.

One embodying example of this invention will now be explained with reference to the accompanying drawings:

Referring to the drawings, a multi-cylinder internal combustion engine 1 has plural cylinders 2, and an intake passage 3. The intake passage 3 is provided at its upstream end portion with an air cleaner 4, on its downstream side with an intake manifold 5 connected to the respective cylinders 2, and at its middle portion with a carburetor 6 and a throttle valve 7 on the downstream side of the carburetor 6.

The throttle valve 7 is turnable in the intake passage 3 through a rotary shaft 8 thereof. A lever member 10 having a throttle wire 9 attached thereto and connected to an acceleration pedal (not shown) is fixed to the rotary shaft 8 so that the throttle valve 7 may be turned in an opening direction (counterclockwise in the drawings) if the wire 9 is pulled, and be turned in a closing direction (clockwise) by the action of a return spring (not shown) if the wire 9 is released from pulling. Additionally, the throttle valve 7 is so arranged that the turning thereof in the closing direction may be stopped at a predetermined idling position by an idling stopper 11 arranged to be brought into abutment with the lever member 10. The throttle valve 7 can also turn further in the closing direction, beyond the idling position, to a closed-valve position thereof predetermined in position by a closed-valve stopper 12 if the idling stopper 11 is retreated from the illustrated operative position to its inoperative position, that is, to the left in the drawings.

The idling stopper 11 is attached to a swing arm 13 mounted swingably on the rotary shaft 8 so that the same may be moved to advance and retreat between its operative position and its inoperative position. A valve closing means 14 for permitting the throttle valve 7 to be turned to the closed-valve position thereof by retreating the stopper 11 to its inoperative position is provided as described below:

Namely, the valve closing means 14 comprises a negative pressure actuator 15 connected to the arm 13, a control valve 17 provided in a negative pressure passage 16 for applying an intake negative pressure in the intake passage 3 to the actuator 15, and a control circuit 18 for the control valve 17.

The control circuit 18 comprises an AND circuit arranged to be inputted with a vehicle speed signal from a vehicle speed sensor 19, an engine speed signal from an engine speed sensor 20, an ON-OFF signal from a clutch swith 21, arranged to be moved with a clutch pedal (not shown), and an ON-OFF signal of a negative pressure switch 22 arranged to be applied with the intake negative pressure in the intake passage 3. Thus, the valve closing means 14 is operated in such a manner that, under such a predetermined deceleration driving condition that the vehicle speed and the engine speed are respectively above predetermined values, the clutch switch 21 is in its ON condition (the clutch pedal is in its inoperative condition) and the negative pressure switch 22 is in its ON condition, a high level value opening signal is generated from the control circuit 18 to open the control valve 17. The negative pressure actuator 15 is thus operated by the intake negative pressure in the intake passage 3 to cause the idling stopper 11 to retreat to its inoperative position through the arm 13. The throttle valve 7 is permitted to turn to the closed-valve position thereof. If the engine speed is reduced to a predetermined returning speed thereof, a low level value closing signal is generated from the control circuit 18 to open the control valve 17. The negative pressure actuator 15 is thus operated by the intake negative pressure in the intake passage 3 to cause the idling stopper 11 to retreat to its inoperative position through the arm 13. The throttle valve 7 is permitted to turn to the closed-valve position thereof. If the engine speed is reduced to a predetermined returning speed thereof, a low level value closing signal is generated from the control circuit 18 to close the control valve 17. The throttle valve 7 is then returned to its idling position by the action of a return spring 15a provided in the negative pressure actuator 15.

Referring to the drawings, an air supply means 23 for supplying a secondary air to the intake passage 3 is provided in order to prevent excessive increase in intake negative pressure in the intake passage 3 that results from closing of the throttle valve 7 at the time of deceleration.

The air supply means 23 comprises a negative pressure responsive air supply valve 25 interposed in air supply passage 24 connected to the air cleaner 4, and a negative pressure responsive control valve 26 interposed in a negative pressure passage 16a diverged from the foregoing negative pressure passage 16 for applying the intake negative pressure to the air supply valve 25. If the intake negative pressure is increased, the control valve 26 is opened to apply the negative pressure to the air supply valve 25. The air supply valve 25 is thereby opened to supply secondary air through the air supply passage 24 from the air cleaner 4 into the intake passage 3 by way of an air supply opening 27 on the downstream end of the air supply passage 24.

Figure 2:
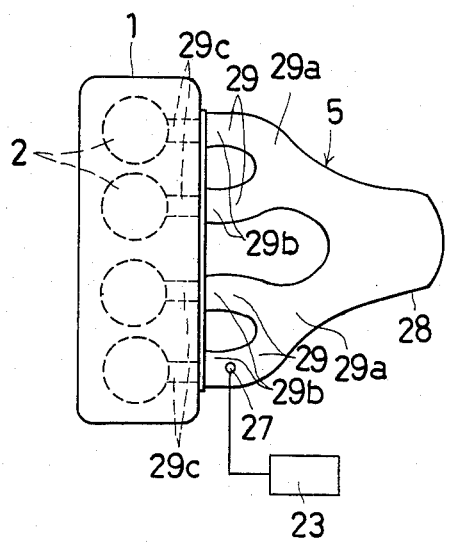
FIG. 2 is a diagram showing a supply position of the secondary air in the first embodiment.

According to this invention, as shown clearly in FIG. 2, for instance, the air supply opening 27 is open to part of plural diverged passages 29 formed on the downstream side of a diverging portion 28 of the intake manifold 5 and connected to the respective cylinders 2, so that the secondary air is supplied to part of the diverged passages 29.

Figure 3:
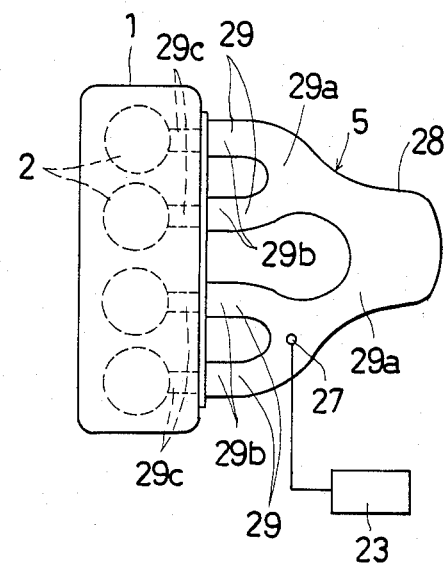
FIG. 3 is a diagram showing a second embodiment.

In this example, the plural diverged passages 29 are composed of first stage diverged passage sections 29a diverged from the diverging portion 28 of the intake manifold 5 and the second stage diverged passage sections 29b which are subdivided from each of the first stage diverged passage sections 29a and which lead to combustion chambers of the respective cylinders 2 through respective intake ports 29c. It may be so modified that the air supply opening 27 is open to the first stage passage section 29a as shown in FIG. 3. Or the same may be made open to one of the intake ports 29c (not shown).

Additionally, in the illustrated example, in order to prevent after-burning in the initial stage of deceleration, an after-burning preventing valve 30 arranged to be opened by the action of the negative pressure generated in the initial stage of deceleration for a short time determined by a throttle opening 30a is provided in a bypass of the foregoing air supply valve 25. The air supply opening connected to the after-burning preventing valve 30 and positioned on the downside thereof may be provided separately from the air supply opening 27 of the air supply means 23 and, for instance, may be made open to the diverging portion 28 of the intake manifold 5.

Referring further to the drawings, an idle-speed increasing means 31 for increasing the idling position of the throttle valve 7 according to increase in an engine load at the time of idling operation may be provided.

Next, the operation of this invention apparatus will be explained as follows:

If the throttle valve 7 is turned to the closed-valve position by the operation of the valve closing means 14 under the foregoing predetermined deceleration driving condition, the after-burning preventing valve 30 is first opened for the predetermined short time, and then the air supply valve 25 of the air supply means 23 is opened by an increase in intake negative pressure as mentioned above. In this manner, secondary air is supplied to diverged passage 29 from the air supply opening 27, and accordingly, the intake negative pressure applied to the combustion chamber of the cylinder 2 connected to the diverged passage 29 is decreased.

The secondary air thus supplied is also supplied to the combustion chambers of the other cylinders in different phases in the engine intake stroke connected to the other diverged passages 29 and prevents excessive increase in intake negative pressure. In such a case, the distance between each of the other diverged passages 29 and the air supply opening 27 is relatively long, so that the flow of the secondary air from the air supply opening 27 thereto is weakened. Consequently, the fuel adhered to the wall surfaces of the other diverged passages 29 remains adhered. Additionally, the secondary air from the supply opening 27 flows through the part of the interior of the diverging portion 28 of the intake manifold 5 into the other diverged passages 29 in the manner of a short circuit, so that the adhered fuel on the wall surface of the diverged portion 28, except for its partial surface along which the secondary air flows, remains as it is, so that the returning characteristics at the time of returning of the throttle valve 7 to the idling position can be improved.

Figure 4:
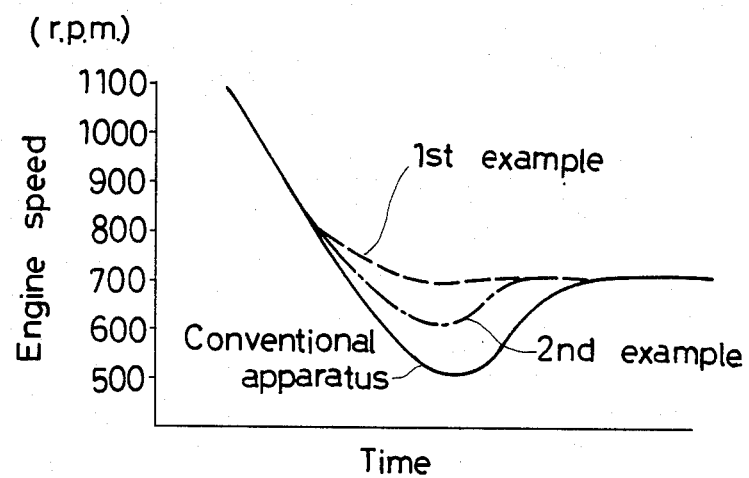
FIG. 4 is a diagram showing returning characteristics of a conventional example and those of the first and the second embodiments of this invention.

FIG. 4 shows the returning characteristics of a conventional example wherein the secondary air is supplied to the diverging portion 28, those of the first example of this invention shown in FIG. 2 wherein the secondary air is supplied to the single diverged passage connected to the single cylinder 2, and those of the second example of this invention shown in FIG. 3 wherein the secondary air is supplied to the diverged passage 29a formed on the upstream side of the two diverged passages 29b, 29b connected to two cylinders 2 are diverged. For the data in FIG. 4, the idling speed of the engine set to be 700 r.p.m. and the returning speed for returning the throttle valve 7 to its idling open position, was set to be 800 r.p.m.

As will be clear from the FIG. 4 example, in the conventional example the engine speed continues to decrease in the manner similar to the decrease at the time of valve closing even after the return of the throttle valve 7 to the idling position, so that the returning of the engine speed to the idling speed is late. In contrast thereto, in the examples according to this invention, the returning characteristics are improved. This is especially so in the first example where the engine speed never decreased below the idling speed, so that it can be returned rapidly to the returning speed.

Thus, according to this invention, the secondary air is arranged to be supplied to part of diverged passages formed on the downstream portion of the diverging portion of the intake manifold and connected to respective cylinders of a multi-cylinder engine, so that the fuel adhered to the diverging portion and the other diverged passages which are not supplied directly with the secondary air remains adhered. Accordingly, the returning characteristics of the engine can be improved in comparison with those in the conventional example wherein the secondary air is supplied to the diverging portion.

It is readily apparent that the above-described deceleration control apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A deceleration control apparatus in a multi-cylinder engine, an intake passage including an intake manifold connected to respective cylinders of a multi-cylinder engine, said intake manifold including at least one diverging portion and a plurality of diverged passages downstream thereof, said apparatus comprising valve closing means for closing a throttle valve in the intake passage beyond an idling position thereof at the time of deceleration, and an air supply means for supplying secondary air to the intake passage, characterized in that the air supply means includes an air supply opening directly in only one of said diverged passages on the downstream side of said diverging portion of the intake manifold.

2. A deceleration control means of claim 1, wherein the valve closing means comprises an idling stopper attached to a swing arm mounted swingably on a rotary shaft of the throttle valve, a negative pressure actuator connected to the arm, a control valve interposed in a negative pressure passage for applying an intake negative pressure in the intake passage to the actuator, and a control circuit for the control valve, and the air supply means comprises a negative pressure responsive air supply valve interposed in an air supply passage connected to an air cleaner provided on the upstream end portion of the intake passage, and a negative pressure responsive control valve interposed in a negative pressure passage diverged from the foregoing negative pressure passage for applying the intake negative pressure to the air supply valve.

3. A deceleration control apparatus of claim 2, wherein the diverged passages comprise at least two, and said air supply opening is in one of the two.

4. A deceleration control apparatus of claim 2 wherein the diverged passages comprise at least a pair of first stage diverged passage sections, and at least a pair of second diverged passage sections subdivided from each of the foregoing first stage diverged passage sections, and said air supply opening is in one of said diverged passage sections.

5. A deceleration control apparatus of claim 1, wherein the diverged passages comprise at least two, and said air supply opening is in one of the two.

6. A deceleration control apparatus of claim 1 wherein the diverged passages comprise at least a pair of first stage diverged passage sections, and at least a pair of second diverged passage sections subdivided from each of the foregoing first stage diverged passage sections, and said air supply opening is in one of said diverged passage sections.

* * * * *

UNITED STATES PATENT AND TRADEMARK OFFICE
CERTIFICATE OF CORRECTION

PATENT NO. : 4,532,900
DATED      : August 6, 1985
INVENTOR(S) : YOSHITAKA HIBINO ET AL It is certified that error appears in the above-identified patent and that said Letters Patent is hereby corrected as shown below:

On the cover page, after Item [22], insert the following:

--- [30]     Foreign Application Priority Data

March 24, 1982 [JP]   Japan ............ 45570/57 ---.

Signed and Sealed this

Eleventh Day of February 1986

[SEAL]

Attest:

DONALD J. QUIGG

Attesting Officer

Commissioner of Patents and Trademarks